STRIPPABLE INSULATED ELECTRICAL WIRE

Filed May 27, 1965

◆ = RETENTIVE BOND
⧗ = RELEASABLE BOND

INVENTOR.
GERSON GEORGE ROGERS
BY
Robertson, Smythe, Bryan & Parmelee
ATTORNEYS.

United States Patent Office 3,463,871
Patented Aug. 26, 1969

3,463,871
STRIPPABLE INSULATED ELECTRICAL WIRE

Gerson George Rogers, Cinnaminson, N.J., assignor to Philadelphia Insulated Wire Company, Moorestown, N.J., a corporation of Pennsylvania Filed May 27, 1965, Ser. No. 459,279
Int. Cl. B32b 7/06; B44d 1/14
U.S. Cl. 174—120 3 Claims

ABSTRACT OF THE DISCLOSURE

Electrical wire is coated with an inner fluorcarbon polymer colloidal silica layer and an outer layer of a polyimide resin in which the inner layer is releasably bonded to the wire and securely bonded to the outer layer.

The invention relates to strippable insulated ultra-miniature hook-up wire, magnet wire and the like.

For some years manufacturers of fine gauge insulated electrical wire have been interested in the use of polyimide type enamel insulating coatings, but have been faced with the problem that such coatings are difficult to remove from the metallic surface of the wire in baring the metal for making electrical connections. Normally, enamels of this nature are removed by one of the following methods:

(1) Mechanical abrading;
(2) Thermal melting;
(3) Chemical dissolving.

These methods are slow and there is risk of impairing the conductive surface of the wire, particularly in the case of the silver-plated copper wire commonly specified for ultra-miniature wire used in many contemporary applications as for example in electronic computers, airplane navigational and monitoring control systems, missile control systems, etc.

I have made the surprising discovery that by applying to the metal wire a prime coating of a type which heretofore has been recommended and used for the purpose of tightly bonding polyimide-type enamel coatings to other materials such as "Teflon" (tetrafluoroethylene), it is possible to secure—not a more secure bonding of the polyimide coating to the wire but rather a releasable bond of a character which allows the insulation to be slipped freely off the wire by a simple stripping operation which leaves the conductive silver plating of the wire virtually unimpaired. This known "bonding" primer consists essentially of a fluorocarbon dispersion in colloidal silica. One suitable primer of this type is marketed by the Dilectrix Corporation under the name, "Special Bonding Solution Pink." The primer I use consists of a thin sintered coat of a tetrafluoroethylene dispersion in colloidal silica, i.e. a dispersion of Du Pont's "Teflon" or "TFE" in colloidal silica. Other known fluorocarbons may be substituted for TFE, as dictated by choice and experience of the particular manufacturer of the "bonding" coatings. A significant aspect of my discovery is that when applied to the bonding of resinous enamel insulating coatings to metal wire, the bonding primer coating becomes a releasing agent. No longer is it necessary to resort to mechanical abrading, melting or chemical dissolution of the insulating coating to accomplish its removal. In this application of the fluorocarbon dispersion there is accomplished the dual purpose of creating at one of the surfaces of the prime coating a retentive bond to the insulation and at the opposite surface thereof a releasable bond to the metal wire. As a result, the composite coating of primer and enamel can be stripped from the fine metal wire as a thin-walled tube without damaging the surface of the wire.

I have found further that this same duality of function of the fluorocarbon dispersion can be secured in the application of resinous enamel insulating coatings to stranded conductor wire. As a preferred example of such insulating coatings I cite the polyimide type resin known as "ML" although in some application it may be desired to use other resinous enamels such as those of the epoxy or polyester types. Typical compositions of the polyimide type resin are disclosed in a trade publication of the Du Pont Co. dated January 1965, identified as Bulletin #19 (revision #2) entitled "Pyre-M.L." wire enamel. In the case of stranded conductor wire, the fluorocarbon dispersion may desirably by applied to a thickness of 2 to 3 mils which will result in its sealing the concavities at the points of tangency of the outer strands, preventing the enamel overcoating from penetrating to full depth of the interstices between the strands of the wire, yet notwithstanding the interlocking nature of the contact between primer and stranded wire the composite coating can be pulled freely away from the wire in the form of a fine monolithic tube of insulation.

In the accompanying drawing I have illustrated the best mode contemplated by me for carrying out my invention.

In the representative embodiment of FIGS. 1, 2, 4 and 5, a silver-plated copper wire 6 of size AWG 30 (0.0100″) carries a prime coating 7 applied as a TFE dispersion in colloidal silica and having a thickness on the order of ¼ mil (0.00025″) over which is applied an insulating coating 8 of a polyimide type insulation such as Du Pont's "ML" polyimide resin, cured in accordance with usual practice. This coating may be applied as a series of thin coats built up to the desired thickness.

Figure 2:
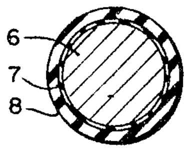
FIG. 2 is a transverse sectional view taken as indicated at 2—2 in FIG. 1.
Figure 1:
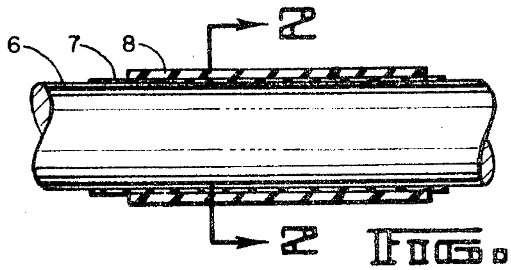
FIG. 1 is a longitudinal sectional view, to a greatly enlarged scale, of an insulated wire embodying my invention as applied to a single strand conductor.
Figure 3:
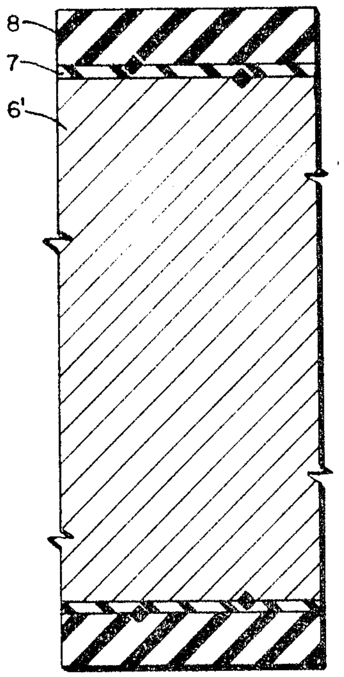
FIG. 3 is a highly magnified diagrammatic representation of a longitudinal section of an enamel-coated TFE wire, using a known bonding solution for such a wire.

FIG. 3 shows what happens when a fluorocarbon dispersion in colloidal silica 7 is used in the manner heretofore recommended for the purpose of tightly bonding a polymide type enamel coating 8 to a "Teflon" wire 6′. The result is indicated by the symbols which appear in the legend directly below FIG. 3. Notice that a retentive bond is formed at both the inner and outer surfaces of the bonding primer 7.

Figure 4:
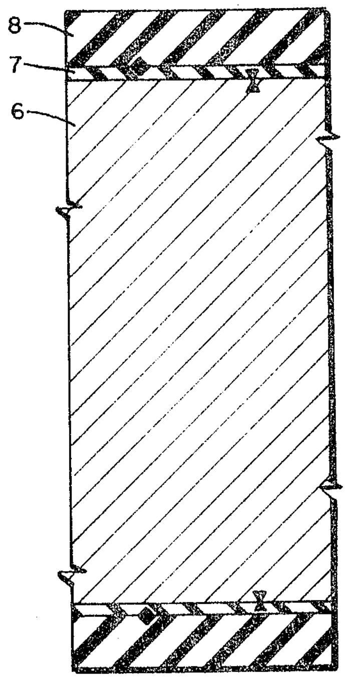
FIG. 4 is a similar representation of an enamel-coated metal wire employing the same "bonding" solution as in FIG. 3, but using such solution as a releasing agent.
Figure 5:
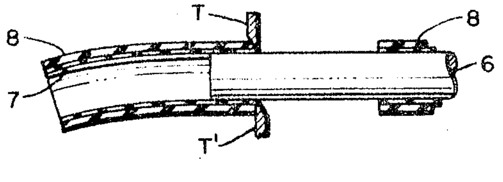
FIG. 5 is a longitudinal sectional view similar to FIG. 1, showing how the composite polyimide type enamel can be stripped freely from the wire in the form of a fine monolithic tube of insulation.

FIG. 4 shows what happens when the same fluorocarbon dispersion is employed according to my invention in applying the enamel coating 8 to a silver-plated copper wire 6. Notice that here, by contrast to FIG. 3, I have obtained—not a more secure bonding of the enamel coating to the wire but rather a releasable bond of the character hereinabove described. Thus the fluorocarbon dispersion here serves the dual purpose of creating at one of its surfaces a retentive bond to the insulation and at its opposite surface a releasable bond to the metal wire. The "bonding" solution has thus been transformed into a releasing agent instead. The practical importance of this is that I have eliminated entirely the need to resort to the troublesome prior art expedients of baring the wire by mechanical abrading, melting or chemical dissolution which so seriously hampered the use of polyimide enameled conductor wire.

The terms and expressions which I have employed are used in a descriptive and not a limiting sense, and I have no intention of excluding equivalents of the invention described.

I claim:

1. A strippable insulated electrical wire comprising:

a metal wire prime coated with an inner layer of the sintered residue of a solid fluorocarbon polymer dispersion of colloidal silica and an outer layer of a polyimide resin bonded to said inner layer, said inner layer being bonded releasably to said wire, wherein the amount of silica in said inner layer is sufficient to provide releasable bonding properties.

2. An insulated wire as set forth in claim 1 wherein the diameter of the metal wire is substantially larger than the thickness of the inner layer.

3. An insulated wire as set forth in claim 2 wherein the metal wire is a silver plated copper wire.

References Cited

UNITED STATES PATENTS

| | | | |
|---|---|---|---|
| 1,845,041 | 2/1932 | Boving | 117—6 |
| 2,485,691 | 10/1949 | Bogese | 264—174 |
| 2,592,147 | 4/1952 | Ikeda. | |
| 2,685,707 | 8/1954 | Llewellyn et al. | 264—174 |
| 2,906,658 | 9/1959 | Doban | 156—315 |
| 3,136,680 | 6/1964 | Hochberg | 117—218 X |
| 3,168,417 | 2/1965 | Smith et al. | 117—218 X |

WILLIAM D. MARTIN, Primary Examiner

R. HUSACK, Assistant Examiner

U.S. Cl. X.R.

117—6, 217, 218; 174—126